US010378870B1

(12) United States Patent
Wu et al.

(10) Patent No.: US 10,378,870 B1
(45) Date of Patent: Aug. 13, 2019

(54) ENERGY ABSORBING FLANGE FOR MELTABLE FUZE PLUG

(71) Applicant: The United States of America as Represented by the Secretary of the Army, Washington, DC (US)

(72) Inventors: Thomas Wu, New Hyde Park, NY (US); Shana Groeschler, Highland Park, NJ (US); Keith Fulton, Stroudsburg, PA (US); Leon Moy, Montclair, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 33 days.

(21) Appl. No.: 15/992,668

(22) Filed: May 30, 2018

(51) Int. Cl.
| | | |
|---|---|---|
| *F42C 19/04* | (2006.01) | |
| *F42C 19/02* | (2006.01) | |
| *F42B 39/14* | (2006.01) | |
| *F16J 15/32* | (2016.01) | |

(52) U.S. Cl.
CPC .............. *F42C 19/04* (2013.01); *F42B 39/14* (2013.01); *F42C 19/02* (2013.01); *F16J 15/32* (2013.01)

(58) Field of Classification Search
CPC .... F42D 1/18; F42D 5/00; F42D 5/045; F28F 11/02; F42B 3/00; F42B 3/087; F42B 3/103; F42B 3/182; F42B 3/24; F42B 3/26; F42B 39/14; F42C 19/06; F42C 19/04; F42C 19/02; F16J 15/32
USPC ........................................................ 102/333
See application file for complete search history.

(56) References Cited

U.S. PATENT DOCUMENTS

| | | | | |
|---|---|---|---|---|
| 195,367 | A * | 9/1877 | Hiller .................... | F22B 37/475 122/504.3 |
| 1,534,204 | A * | 4/1925 | Dunlap .................. | F42C 19/04 217/56 |
| 2,466,726 | A * | 4/1949 | Moore ..................... | F42C 1/00 102/239 |
| 2,826,222 | A * | 3/1958 | Case ...................... | B65D 59/02 138/96 R |
| 2,866,413 | A * | 12/1958 | Roquemore ............. | F02K 9/38 239/265.11 |
| 3,181,439 | A * | 5/1965 | Flax ..................... | B29C 67/0018 156/293 |
| 3,185,489 | A * | 5/1965 | Klinger-Lohr .......... | F16J 15/32 251/315.03 |
| 3,464,709 | A * | 9/1969 | Eckenrod ............ | E21B 33/1208 277/342 |
| 3,665,857 | A * | 5/1972 | Radnich ................ | F42B 39/00 102/481 |
| 3,727,925 | A * | 4/1973 | Jones ..................... | F16J 15/32 277/468 |
| 3,731,585 | A * | 5/1973 | Demberg ................ | F42B 39/14 206/3 |
| 3,757,695 | A * | 9/1973 | Fisher .................... | F42C 11/00 102/207 |

(Continued)

*Primary Examiner* — Joshua E Freeman
*Assistant Examiner* — Bridget A Cochran
(74) *Attorney, Agent, or Firm* — Michael C. Sachs

(57) ABSTRACT

A meltable fuze plug for a munition has an upper flange ringed by a specially corrugated steel washer to absorb impacts of various strength levels from various directions, and against falls, to protect the ogive and munition. The meltable fuze plug renders the munition insensitive. It is formed of a meltable plastic for facilitating venting of the munition's interior areas during unexpected fires or explosions.

5 Claims, 5 Drawing Sheets

(56) References Cited

U.S. PATENT DOCUMENTS

| | | | | |
|---|---|---|---|---|
| 3,764,149 A | * | 10/1973 | Zillman | F16J 15/32 277/370 |
| 3,820,479 A | * | 6/1974 | Fylling | F42B 39/14 109/1 R |
| 3,841,644 A | * | 10/1974 | White | F16J 15/24 156/169 |
| 3,927,791 A | * | 12/1975 | Hershberger | F22B 37/46 102/481 |
| 4,205,608 A | * | 6/1980 | Nicolaides | F42C 19/04 102/200 |
| 4,222,484 A | * | 9/1980 | Howe | B65D 81/02 206/3 |
| 4,727,789 A | * | 3/1988 | Katsanis | F41H 5/023 109/49.5 |
| 5,035,181 A | * | 7/1991 | Jacks | F42B 39/20 102/293 |
| 5,494,152 A | * | 2/1996 | Sobczak | B65B 23/00 102/202.12 |
| 5,645,184 A | * | 7/1997 | Rowse | B65D 88/14 220/1.5 |
| 6,302,025 B1 | * | 10/2001 | Adimari | F42C 7/00 102/254 |
| 6,311,622 B1 | * | 11/2001 | Adimari | F42C 9/142 102/259 |
| 6,336,407 B1 | * | 1/2002 | Adimari | F42C 9/142 102/259 |
| 7,331,292 B1 | * | 2/2008 | Kim | F42B 15/34 102/473 |
| 8,381,656 B1 | * | 2/2013 | Woo | F42B 39/20 102/481 |
| 9,329,010 B1 | * | 5/2016 | Moy | F42B 39/20 |
| 9,410,782 B2 | * | 8/2016 | Bruno | F42C 15/34 |
| 9,441,894 B1 | * | 9/2016 | Moy | F42B 39/20 |
| 9,915,366 B2 | * | 3/2018 | Kendricks | F16K 17/383 |
| 10,030,955 B1 | * | 7/2018 | Sapp | F42B 27/00 |
| 10,066,917 B1 | * | 9/2018 | Youn | F42B 39/20 |
| 2003/0205161 A1 | * | 11/2003 | Roach | F42B 39/14 102/481 |
| 2003/0217770 A1 | * | 11/2003 | Schultz | F16K 17/383 137/73 |
| 2006/0054046 A1 | * | 3/2006 | Cook | F42B 39/14 102/481 |
| 2008/0173205 A1 | * | 7/2008 | Hawkins | F42D 1/18 102/333 |
| 2010/0089272 A1 | * | 4/2010 | Cook | F42B 39/14 102/481 |
| 2010/0314402 A1 | * | 12/2010 | Traxler | F42B 39/20 220/745 |
| 2012/0285956 A1 | * | 11/2012 | Kotefski | B65D 90/32 220/89.1 |
| 2012/0298005 A1 | * | 11/2012 | Kotefski | F42B 39/14 102/481 |
| 2013/0199365 A1 | * | 8/2013 | Gaertner | F04B 1/0448 92/168 |
| 2013/0291754 A1 | * | 11/2013 | Kotefski | B65D 90/32 102/481 |
| 2015/0000546 A1 | * | 1/2015 | Kotefski | B65D 90/36 102/481 |
| 2017/0260979 A1 | * | 9/2017 | Muller | F01C 19/005 |
| 2017/0299063 A1 | * | 10/2017 | Itadani | F16C 33/74 |

* cited by examiner

ENERGY ABSORBING FLANGE FOR MELTABLE FUZE PLUG

U.S. GOVERNMENT INTEREST

The inventions described herein may be made, used, or licensed by or for the U.S. Government for U.S. Government purposes.

BACKGROUND OF INVENTION

Ammunition and other munitions typically may have fuze devices that are threaded into a top ogive area on such rounds. Munition rounds may be stored, transported, and handled such as on pallets, in an unfuzed condition. In such cases, instead of the fuze device, a meltable fuze plug (MFF) is threaded into its place. Ultimately, the meltable fuze plug will be removed and a fuze device installed in its place preparatory to ultimate use. The meltable fuze plug thus aids in handling. In the course of such handling activities, the rounds may unfortunately suffer damage due to various impacts with other rounds or with other service items or dropped on the ground. Any damage causes loss and need of replacement of sparse and expensive rounds, and if damage is undetected, a dangerous round may be attempted to be used which could cause explosions or injuries to personnel and other equipment. Further unfortunate damage may come from temperature exposure, moisture, radiation, unexpected fires and explosions. Unknown damages and fires could catastrophically cause unexpected initiation of highly explosive payloads and propellants carried in such munitions. Clearly then, anything that could improve the meltable fuze plug devices to shield against such damages is of great importance. Impact damage to the rounds must be minimized in all ways possible. Furthermore, features on the meltable fuze plug which could facilitate venting out the munition in the event of hot cook-off situations are of very great importance. While fires may occur, a contained munition could explode more violently than it needed to, had it only been able to vent out the interior gases in the munition. Such considerations are termed rendering the round more insensitive to fratricidal damage ("IM") (insensitive munitions) considerations.

BRIEF SUMMARY OF INVENTION

A meltable fuze plug is provided which has a crescent shaped upper area with an empty lunette for holding. Thus the whole munition may be carried in various ways through the lunette area. The meltable fuze plug has an upper flange which is ringed by a specially designed corrugated steel washer to absorb impacts of various strength levels, from various directions, and drops, to protect the ogive of the munition. Further, the meltable fuze plug is threaded into the ogive with the presence of two O-rings, the larger (thicker cross-section) one to keep out moisture and the other smaller (thinner cross-section) one to resist unwanted de-torqueing of the meltable fuze plug. Also, the meltable fuze plug is made of meltable plastic for facilitating venting of the munition's interior areas during unexpected fires. Again, the diameter of a plastic flange on the meltable fuze plug is optimally slimmed in size to further accommodate the corrugated washer all to better absorb shock damages from 7 feet test drops. The meltable fuze plug still accommodates venting in the event of a fire or explosion. Furthermore, the meltable fuze plug has circumferential flat notches and axial ribs to aid in turning and removing damaged meltable fuze plugs; this makes the munitions more repairable and so, saves money.

OBJECTS OF THE INVENTION

Accordingly, it is an object of the present invention to provide a protective and damage resisting meltable fuze plug for a munition, which also comprises an upper crescent with a lunette to facilitate meltable fuze plug purposes for the munition.

Another object of the present invention is to provide a protective and damage resisting meltable fuze plug for a munition which utilizes a corrugated steel washer to aid in absorbing impacts to the munition of various strength levels.

It is yet another object of the present invention to provide a protective and damage resisting meltable fuze plug for a munition where the meltable fuze plug is threaded into the ogive with the presence of two O-rings, one to prevent inflow moisture seepage and the other to resist unwanted de-torqueing of the meltable fuze plug.

It is a still further object of the present invention to provide a protective and damage resisting meltable fuze plug for a munition which meltable fuze plug has circumferential flat notches and axial ribs to aid in turning and removing damaged meltable fuze plugs, making replacement easier and more economical.

It is yet another object of this invention to provide a plastic meltable fuze plug for a munition which may melt during an unexpected fire, or heating event, to vent the munition for insensitive munition/anti fratricidal effects, to reduce possibility of explosion of the munition.

These and other objects, features and advantages of the invention will become more apparent in view of the within detailed descriptions of the invention, the claims, and in light of the following drawings wherein reference numerals may be reused where appropriate to indicate a correspondence between the referenced items. It should be understood that the sizes and shapes of the different components in the figures may not be in exact proportion and are shown here just for visual clarity and for purposes of explanation. It is also to be understood that the specific embodiments of the present invention that have been described herein are merely illustrative of certain applications of the principles of the present invention. It should further be understood that the geometry, compositions, values, and dimensions of the components described herein can be modified within the scope of the invention and are not generally intended to be exclusive. Numerous other modifications can be made when implementing the invention for a particular environment, without departing from the spirit and scope of the invention.

LIST OF DRAWINGS

DETAILED DESCRIPTION

Figure 1:
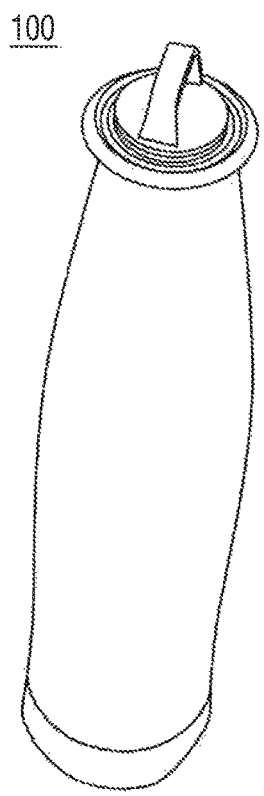
FIG. 1 shows a top isometric view of a munition having a meltable fuze plug according to this invention.
Figure 2:
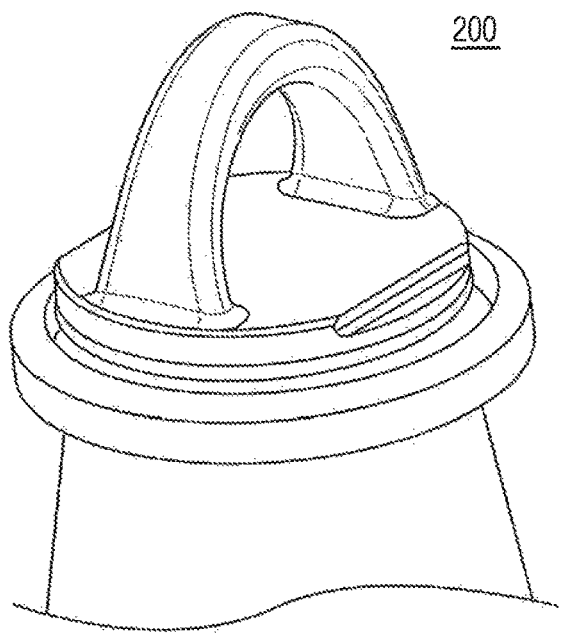
FIG. 2 is another view of the meltable fuze plug according to this invention in place in a munition.
Figure 3:
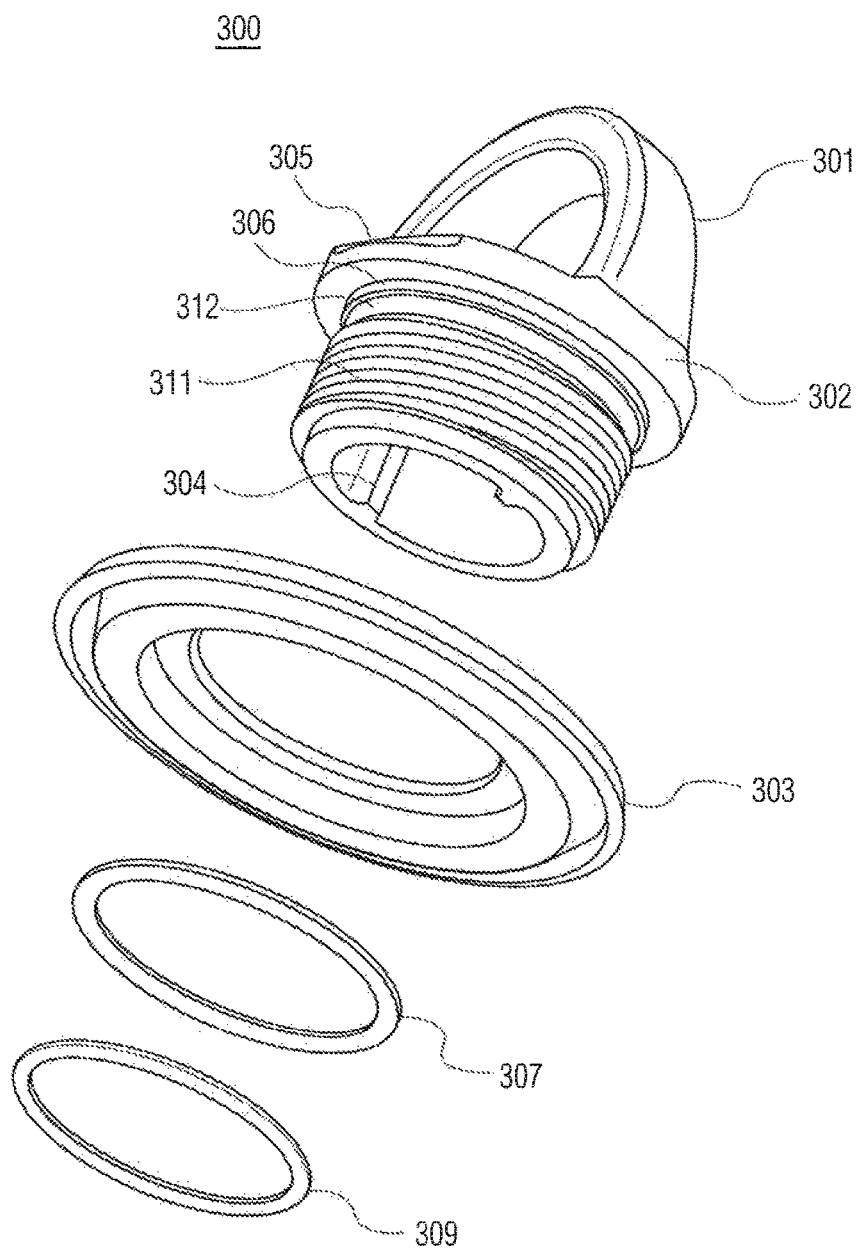
FIG. 3 is an exploded view of a meltable fuze plug assembly according to this invention.
Figure 4:
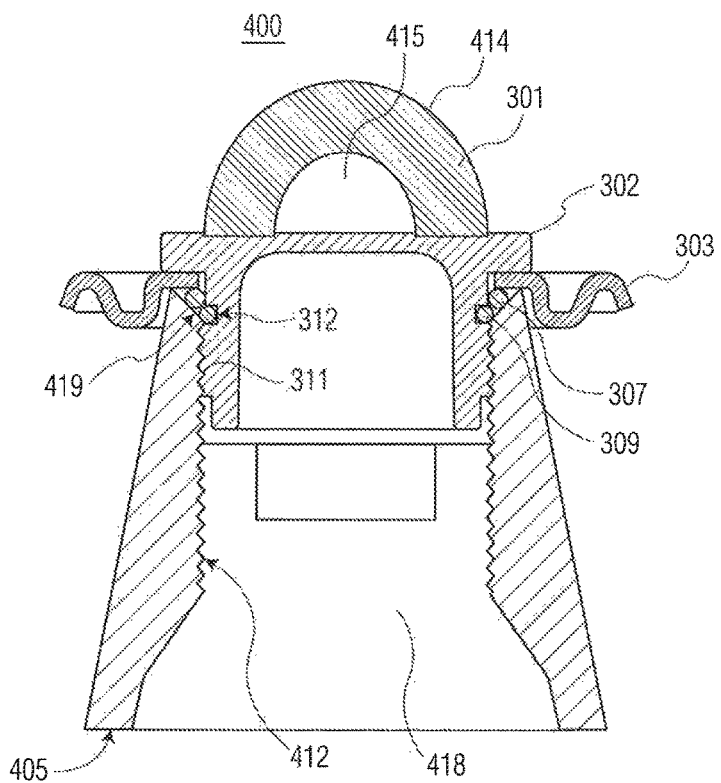
FIG. 4 shows a cross sectional view of the ogive on an upper section view of a munition, also including therein a cross sectional view of a meltable fuze plug with corrugated washer, and with large (thick cross-section) and small (thin cross-section) O-rings, installed in their assembled positions according to this invention.
Figure 5:
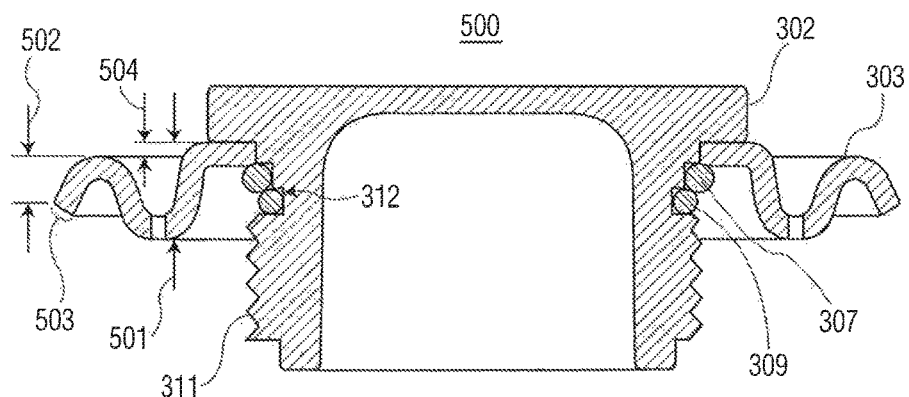
FIG. 5 shows a cross sectional view of the meltable fuze plug without the meltable fuze handle, and with corrugated washer, large and small O-rings installed in their assembled positions.
Figure 6A:
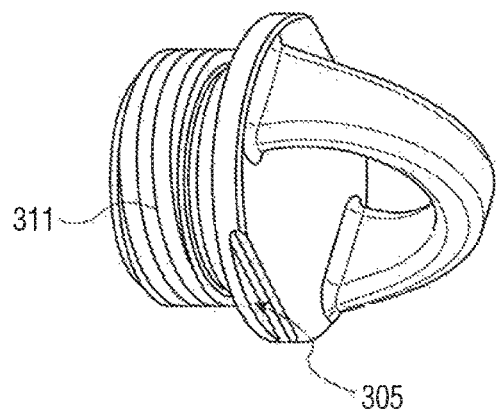
FIG. 6A shows an isometric view of a meltable fuze plug according to the invention.
Figure 6B:
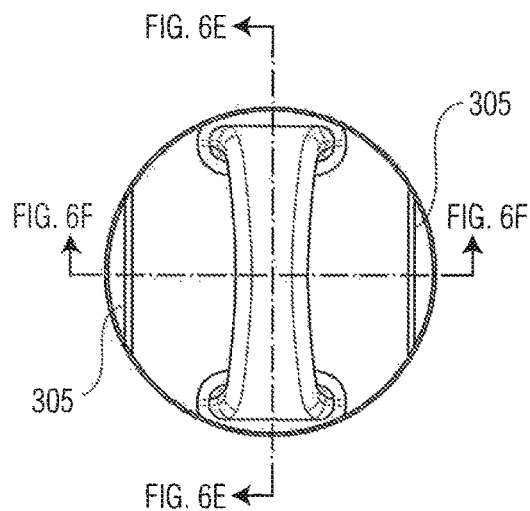
FIG. 6B shows a top view of a meltable fuze plug according to the invention.
Figure 6C:
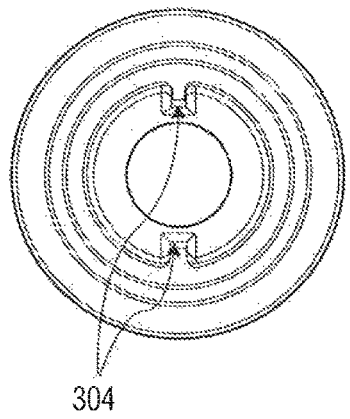
FIG. 6C shows a bottom view of the meltable fuze plug of FIG. 6A.
Figure 6D:
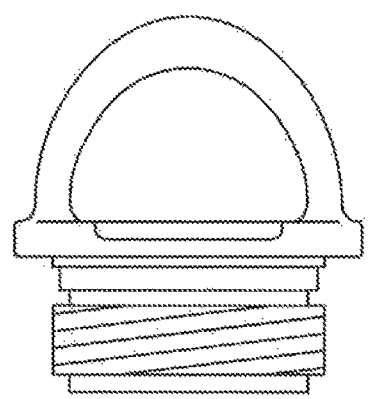
FIG. 6D shows a front side (or back side) view of a meltable fuze plug according to the invention.
Figure 6E:
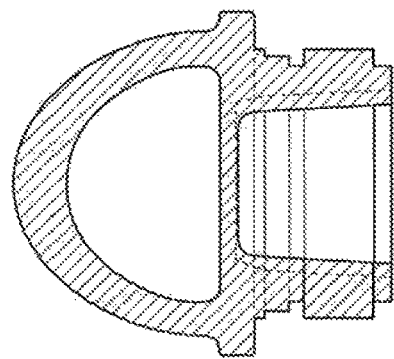
FIG. 6E shows a cross sectional view of a front side of the meltable fuze plug shown by FIG. 6D.
Figure 6F:
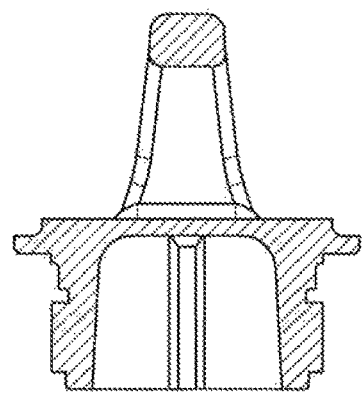
FIG. 6F shows a cross sectional view of a side view (either left or right side) of a meltable fuze plug according to the invention.

FIG. 1 shows a top isometric view of a munition 100 having a meltable fuze plug according to this invention. FIG. 2 is a more close up view of this meltable fuze plug in place in a munition 200. FIG. 3 is an exploded view of a meltable fuze plug 301 according to this invention, in place atop an ogive 405 (see FIG. 4) of a munition having a hollow ogive cavity 418. It has a crescent shaped meltable fuze handle 414 with a lunette 415. It is shown with its upper flange 302, internal cavity ribs 304, notches 305 on the flange to aid in turning; a corrugated washer 303, a circumferential smooth surface 306, large O-ring 307, slightly below the circumferential smooth surface, a circumferential groove 312, and a small O-ring 309 sitting in the groove. Upper flange 302 should be of diameter sufficient to eliminate any interference from a maximal 2.5625 inch diameter hole size for fuze plug openings on many wood pallet top covers for the rounds, to insure ejection of, at least, the plastic portion of the plug for venting, and also of diameter appropriate to accommodate mounting of the corrugated washer 303, arranged to absorb impacts. The meltable fuze plug has external threads 311, immediately below the groove area, five or other number of threads, which mate into internal threads 412 on the inside diameter of the munition's ogive. The larger O-ring 307 has a thicker cross-sectional diameter than the smaller O-ring 309. The smaller O-ring, jammed between the groove and the threads of 412 on the other side, is for anti-loosening purposes, while the larger O-ring, simultaneously contacts three surfaces—underside of the washer 303, smooth circumferential perimeter surface of 306 (above groove 312), and the canted sloping downward surface on top of the ogive of the artillery shell 419, forms a moisture barrier against atmospheric moisture intrusion and also serves the purposes of corrugated washer 303 retention. The O-rings could be made of various materials; nitrile or most rubbers could work, based on environmental requirements. A possible choice is MIL-G-21568, class 1 nitrile. FIG. 4 shows a cross sectional view of the ogive 405 on an upper section view of a munition, also including therein a cross sectional view of the meltable fuze plug 301 with corrugated washer 303, large O-ring 307 and small O-ring 309, installed in their assembled positions. FIG. 5 shows a more close up detailed cross sectional view of the meltable fuze plug in part, with corrugated washer 303, large O-ring 307 and small O-ring 309, installed in their assembled positions. Considerable thickness of the washer 303, shown at edge 503, is done to greatly increase the strength of the washer against impacts that would otherwise hurt the ogive, e.g. It will be appreciated that the corrugated washer 303 is formed so it has a larger amplitude wave 501 nearest to the ogive; this is to spread the force of impact to a wider footprint on the inner wall of the washer and lower the stress level on the ogive. A smaller amplitude wave 502 is designed to increase the absorption energy in the outer portion of the washer before it bends and distorts itself, it is offset by distance 504 at the top, to shift the impact zone to a thicker portion of the ogive in order to better resist denting. The amplitude of wave 502 must be smaller than the amplitude of wave 501. All these features aid to deflect or minimize the force impinging on the nose of the ogive and prevent distortion. FIGS. 6A through 6E show various detailed views of the meltable fuze plug; For example, FIG. 6A shows an isometric view of the meltable fuze plug; FIG. 6B shows a top view of the meltable fuze plug; FIG. 6C shows the bottom view of the meltable fuze plug of FIG. 6A; FIG. 6D shows a front side (or back side) view of the meltable fuze plug; FIG. 6E shows a cross sectional view of the front side of the meltable fuze plug shown by FIG. 6D, and; FIG. 6F shows a cross sectional view of the side view (either left or right side) of the meltable fuze plug.

While the invention may have been described with reference to certain embodiments, numerous changes, alterations and modifications to the described embodiments are possible without departing from the spirit and scope of the invention as defined in the appended claims, and equivalents thereof.

What is claimed is:

1. In an unfuzed munition having a hollow stem (413) and a front ogive portion (405) having internal threads (412), a meltable, vented, shock absorbing fuze plug assembly (300) which protects the ogive and munition from physical damage and also vents out burning energetic material from the munition for IM sensitivity effects, said fuze plug assembly comprising a meltable plastic fuze plug (301) having a handle (414) with a lunette (415) thereon, and also having a cylindrical lower area with external threads thereon (311) sized to said stem (418) and said internal threads (412), and also includes an upper flange (302), with an over sized metal washer mounted immediately below said upper flange, arranged to absorb impacts against said munition and ogive, said metal washer oversized in diameter compared to the diameter of said upper flange (302); wherein said metal washer is sheet steel of a defined thickness for significant shock attenuation and comprises corrugations following cross-sectionally sinusoidal shaped wave patterns, where the waves are largest in amplitude (501) nearest to the munition ogive body, then decline to lower amplitudes (502) farther from the munition ogive body, the corrugation of the metal washer having cross-sectionally sinusoidal shaped wave patterns then finally ending in a plain edge (503) farthest from the munition ogive body.

2. The fuze plug assembly of claim 1 also having a large cross-section O-ring (307) and a small cross-section O-ring (309) engaging said external threads and surfaces to aid in preventing the fuze plug (301) from moisture seepage and inadvertent de-torqueing, respectively, the uncompressed state said O-rings outside diameter being larger than the inside diameter of the corrugated washer, said large O-ring positioned immediately underneath the location of the washer and emplaced on a smooth circumferential surface (306) to prevent moisture from travelling into the munition and said small O-ring positioned immediately beneath the position of said large O-ring and emplaced above the ogive internal threads and in a groove (312) on the plug to retain the corrugated washer on the fuze plug (301) and resist de-torqueing.

3. The fuze plug assembly of claim 2 further including internal vertically aligned ribs (304), and also including turning notches (305) on said upper flange (302) thereon both which features aid in detaching a damaged fuze plug from said munition.

4. The fuze plug assembly of claim 1 wherein the metal washer having corrugations is made from thick gage sheet steel.

5. The fuze plug assembly of claim 4 wherein the large amplitude wave (501) serves to spread impact forces and lower stress on the projectile ogive, and the small amplitude wave (502) is designed to increase energy absorption before bending and is placed at a lower offset distance (504) from the top of the large amplitude wave, in order to be aligned to a thicker ogive area, to better resist distortion.

* * * * *